(12) United States Patent
Schneider et al.

(10) Patent No.: US 6,194,682 B1
(45) Date of Patent: Feb. 27, 2001

(54) PLASMA CUTTER WITH INTEGRATED AIR COMPRESSOR

(75) Inventors: Joseph C. Schneider, Menasha; Thomas A. Bunker, Appleton, both of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/407,748

(22) Filed: Sep. 28, 1999

(51) Int. Cl.[7] .................................................. B23K 10/00
(52) U.S. Cl. .............................. 219/121.55; 219/121.48; 219/121.54
(58) Field of Search .................... 219/121.54, 121.57, 219/121.55, 74, 75, 121.36, 121.39, 121.44

(56) References Cited

U.S. PATENT DOCUMENTS

| | | |
|---|---|---|
| 3,771,585 * 11/1973 | Ulrich | 164/252 |
| 4,465,920 8/1984 | Hoyt et al. . | |
| 5,041,710 8/1991 | Hamal . | |
| 5,218,180 6/1993 | Fujishima . | |
| 5,436,425 7/1995 | Sorkin . | |
| 5,660,745 * 8/1997 | Naor | 219/121.57 |
| 5,726,416 3/1998 | Katooka et al. . | |

OTHER PUBLICATIONS

Thermadyne Thermal Dynamics® Drag–Gun™ Systems Features Jul. 1998.
Miller® Model: Spectrum™ Owner's Manual Sep. 1989.
Miller® The Power of Blue Spectrum® 300 CutMate™ Sep. 1998.
MAX20 Air Pack Hypertherm Apr. 1988.

* cited by examiner

*Primary Examiner*—Mark Paschall
(74) *Attorney, Agent, or Firm*—George R. Corrigan (57) ABSTRACT

A method and apparatus for plasma cutting includes a cutting power supply, preferably a buck converter, and a compressor. The cutting power supply provides power to a plasma torch, and the compressor provides air to the torch. The air compressor is integrated into the plasma cutter, and includes a compressor motor, preferably with a buck convertor power supply, or having the motor windings are part of the buck converter that is the cutting power supply. The motor is regulated regulator to a fixed setpoint or a user setpoint by a compressor regulator in response to a feedback signal, preferably a compressor motor voltage feedback signal. The compressor also turns the compressor on and/off in response to a trigger and/or cutting current feedback signal and has an on/off circuit responsive thereto in various alternatives. The cutting power controller and the compressor regulator are part of an integrated controller, and/or the cutting power supply and the air compressor are in a common housing, and/or the cutting power supply and the air compressor have an integrated power supply.

24 Claims, 5 Drawing Sheets

PLASMA CUTTER WITH INTEGRATED AIR COMPRESSOR

FIELD OF THE INVENTION

The invention relates generally to plasma arc cutting and welding power supplies. More specifically, it relates to plasma arc cutting and welding power supplies having an air compressor.

BACKGROUND OF THE INVENTION

Plasma arc cutting is a process in which an electric arc is used to cut a metallic workpiece. Generally, plasma arc cutting uses an electric arc between an electrode and the metal to be cut. The arc creates a plasma that cuts the metallic workpiece. Plasma cutters are often used in applications such as building maintenance (structural or HVAC) where they are carried from job to job, and thus are preferably highly portable.

A typical prior art plasma arc cutter includes a power supply, and/or an air supply, and/or torch. A torch or plasma torch is used to create and maintain the arc and plasma jet that perform the cutting. A plasma cutting power supply receives an input voltage (from a power line or generator) and provides an output voltage to a pair of output terminals, one of which is the electrode and the other of which is connected to the workpiece. There are numerous types of known plasma arc cutting power supplies, such as magnetic power supplies, inverter power supplies, phase control power supplies, and choppers or secondary switchers. The Miller Spectrum™ 300 plasma power supply is an example of a prior art chopper type power supply. Plasma cutting power supply, as used herein, includes one or more of the input power lines, transformers, convertors/inverters etc, output power lines, and controller, that cooperate to provide power to the arc.

An air supply is used with most plasma cutters to help start the arc, control the torch, and cool the torch. U.S. Pat. No. 4,791,268, to Sanders, et al., describes a plasma torch controlled with air. A movable electrode is the cathode and a fixed nozzle is the anode. A pilot current is provided to the cathode and anode, which are forced into contact by a spring. After electrical current begins to flow from the electrode to the nozzle, gas or air supplied to the torch counteracts the spring force and moves the electrode away from the nozzle. This breaks the electrical contact between the electrode and the nozzle and creates the pilot arc. Also, as the electrode moves away from the nozzle, it opens a nozzle orifice (connected to the air supply), and a plasma jet is created.

The plasma jet causes the arc to transfer (at least in part) to the work piece, thus initiating cutting. Electronics in the power source sense when the arc has transferred and then supply a greater magnitude main cutting current after the transfer has occurred. Also, the torch tip is disconnected (electrically) interrupting the pilot current path. Thus, the current is used to cut the workpiece, and follows a path including the positive terminal, the workpiece, and the electrode.

An example of such a system is described in U.S. Pat. No. 5,660,745, entitled Method And Apparatus For A Contact Start Plasma Cutting Process, issued Sep. 28, 1999, to Naor, and assigned to the assignee of the present invention, and hereby incorporated by reference. As described therein, air flow is provided after the cutting has ceased (post flow) for post-arc cooling is desirable.

The prior art describes several ways to provide air for the plasma process. A tank of air has been provided. This may provide a supply of air, but it limits portability. Another system uses a shop-source of air (such as a central compressor). This obviously limits portability by requiring a nearby "shop-air" outlet.

Another prior art system uses an air compressor separate from the plasma cutter. Such a compressor may simply be an off-the-shelf compressor, and uses a separate power source, is controlled separately, and is in a separate housing. Such a compressor is not an integrated compressor, and not highly portable. Also, such prior art does not typically provide air only when needed, nor does it provide air always when needed, for example for post flow. An air compressor is integrated into the plasma cutter when the compressor shares at least one of a common housing, a common power source, or a common control signal or circuit with the power supply. The separate compressor also limits portability, and is not controlled specifically with plasma cutting in mind.

Other prior art systems include an air compressor integrated with the plasma cutter, but the compressor is either unregulated, or the air pressure is regulated using a mechanical valve.

A compressor is regulated when the motor is controlled in response to feedback such as motor current, voltage, functions of current and voltage, motor rpm, output pressure, air flow, etc. An unregulated compressor is often oversized to be sure to provide adequate air, and is not controlled with the plasma cutter, so that it runs at times when no air is needed. This may be expensive and inefficient. Also, a larger than necessary air supply reduces portability. Examples of an unregulated integrated air supply is the Miller Spectrum® 187D, and Thermal Dynamics DragGun™.

Prior art also teaches regulated air pressure by pressurizing a tank with a compressor to a pressure greater than that needed. A mechanical valve is controlled to regulate the pressure down to a desired value. Thus, the pressure is regulated, but the compressor is not regulated. One such system provided that either the compressor ran (charging the air tank), or cutting could be performed, but not both, thus limiting the current draw. Such systems may be inefficient, and heavier than necessary, because the compressor is over-sized, and runs more than actually needed to build up a high enough pressure to be regulated down to the desired pressure. Examples of this type of prior art include a Hypertherm AirPak™.

Accordingly, a plasma cutter with an integrated air compressor is desired. Preferably, the compressor will be regulated so that it can be appropriately sized and controlled. Also, preferably, the air compressor is integrated with the cutter by having one or more of a common housing, a common control circuit or signal, and a common power supply. Preferably, such a plasma cutter will have an air compressor that is turned on only when needed, and controlled with the cutter.

SUMMARY OF THE PRESENT INVENTION

According to a first aspect of the invention a plasma cutter includes a cutting power supply and an air compressor. The cutting power supply provides power to a plasma torch, and the compressor provides air to the torch. The air compressor is integrated into the plasma cutter, and includes a compressor motor. The motor is regulated by a compressor regulator in response to a feedback signal.

The compressor regulator receives a trigger and/or cutting current feedback signal and has an on/off circuit responsive thereto in various alternatives.

The compressor regulator has a fixed setpoint, or a user setpoint, and the feedback signal may be a compressor motor voltage feedback signal in other alternatives.

A cutting power controller receives the trigger signal and a cutting power feedback signal, and has a set point. The cutting power controller controls the cutting power supply in response to the trigger signal, the set point and the cutting power feedback signal.

The cutting power controller and the compressor regulator are part of an integrated controller, and/or the cutting power supply and the air compressor are in a common housing, and/or the cutting power supply and the air compressor have an integrated power supply in various embodiments. For example, the cutting power supply includes a transformer having a cutting winding and a compressor winding.

The air compressor includes a buck convertor, wherein the air compressor motor is at least a part of the inductive element or the cutting power supply includes a buck convertor, wherein the air compressor motor is at least a part of the inductive element in other embodiments.

According to a second aspect of the invention a method of plasma cutting includes providing plasma cutting power to a plasma torch with a cutting power supply, compressing air with an integrated air compressor having a compressor motor, providing the compressed air to the plasma torch, and regulating the air compressor in response to feedback.

The compressor is turned on and off in response to a trigger signal or plasma current feedback signal in alternative embodiments.

A motor voltage feedback signal is compared to a fixed setpoint in one implementation.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a preferred controller and preferred power circuits, using components chosen for a preferred implementation, it should be understood at the outset that the plasma cutter or welding power supply can also be implemented with other controllers, power circuits, components and/or for other applications.

Generally, the present invention provides for a plasma cutter (or welding power supply) having an integrated air compressor. The air compressor has a regulated motor and a compressor regulator. The plasma cutter provides electrical power to a cutting (or welding) torch, and the compressor provides air to the torch. The air compressor may be integrated into the plasma cutter by having a common or integrated housing, and/or by having a common or integrated control circuit, and/or by having a common or integrated source of power.

Integrated housing, as used herein, includes a single housing in which the cutting power supply and/or control circuit and the air compressor and/or motor regulator are disposed. Integrated power supply, as used herein, includes the cutting power circuit and the motor power circuit having common input power, such as from a 110 vac plug, a common transformer core or winding, or a common DC bus, for example, and the power circuits may be in a common housing or in separate housings. Integrated controller, as used herein, includes a control circuit that controls the cutting power supply and compressor, or separate control circuits that share control signals, and may be on a single board, multiple boards, in a common housing, or in separate housings.

Figure 1:
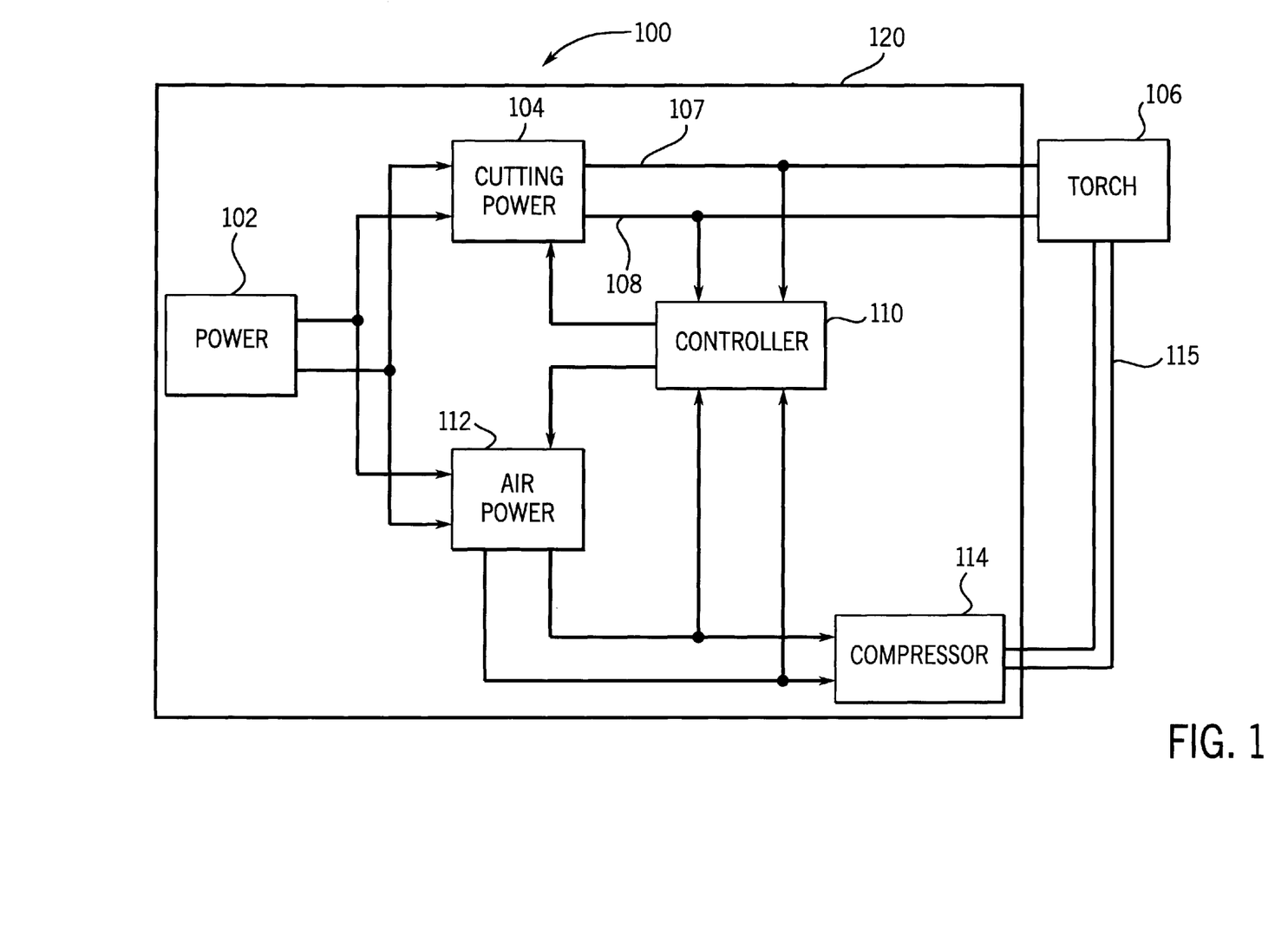
FIG. 1 is a block diagram of a plasma cutter constructed in accordance with the present invention.

FIG. 1 shows a plasma cutter 100 constructed in accordance with a preferred embodiment having an integrated air compressor disposed in an integrated housing 120. Plasma cutter 100 includes a power source 102 that provides power to a cutting power supply 104 and air power supply 112. Power source 102 includes a transformer core and a primary winding shared by the compressor and cutter, with separate secondary windings, in the preferred embodiment.

Power source 102 includes, in alternative embodiments, a secondary winding that provides power to the compressor and cutter power circuit (using either the same or different secondary taps), or a shared transformer and rectifier, with power from the rectifier feeding (directly or indirectly) power to the cutting power circuit and the compressor. Power source 102 includes, in another alternative embodiment, a separate transformer (core and windings), but a common connector to utility or engine power (such as a standard 110 vac plug).

Cutting power supply 104 provides cutting power on a pair of lines 107 and 108 to a torch 106. Cutting power supply 104 is controlled by a controller 110. Feedback may be provided from cutting power supply 104 and/or output lines 107 and 108, and/or torch 106 to controller 110. The feedback may be used to regulate cutting power supply 104, and can include voltage, current, power, functions thereof (dI/dt e.g.), a trigger signal (from torch 106 e.g.), and user selectable or fixed setpoints. Fixed setpoint, as used herein, is a setpoint or parameter that is preferably factory set or not user selected on a control panel. User setpoint, as used herein, is a setpoint or parameter that may be selected by the user, preferably on control panel or digital input. Trigger signal includes any signal from the user indicating an intention to cut or the completion of a cut, and can be from the torch or control panel.

Air power supply 112 provides power to a compressor 114. Air power supply 112 is also controlled by controller 110, and common control signals and feedback signals are used to control air power supply 112 and cutting power supply 104: Thus controller 110 is an integrated controller. Compressor 114 provides air via an air hose 115 to torch 106. Feedback may be provided from the output of the air power supply 112, or from within the air power supply 112, to controller 110 to control or regulate air power supply 112. Additionally, feedback signals from torch 106 (such as a trigger signal) and/or cutting power supply 104 may also be used to regulate air power supply 112.

Compressor regulator or motor regulator, as used herein, includes a controller or regulator for a compressor or compressor motor that controls the motor (adjusts power, current or voltage provided thereto) in response to a feedback signal. The feedback signal may include a motor feedback signal (a motor operating parameter such as current, voltage, power, functions thereof, rpm, etc.), or an air feedback signal (air pressure, air flow, etc.)

Figure 2:
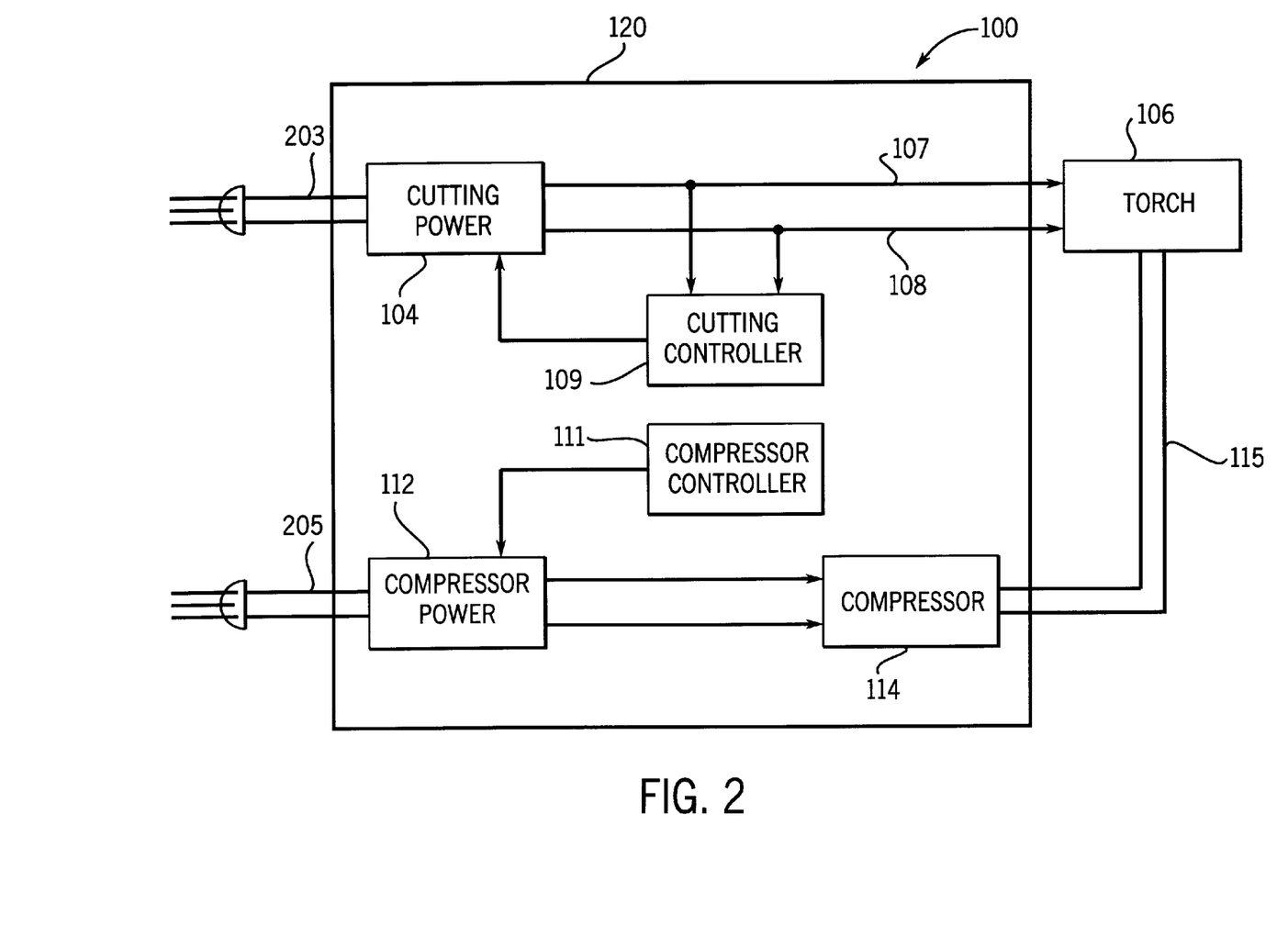
FIG. 2 is a block diagram of a plasma cutter constructed in accordance with the present invention.

FIG. 2 shows plasma cutter 100 constructed in accordance with an alternative embodiment. Cutting power supply 104 and air power supply 112 are not integrated in this embodiment because cutting power supply 104 has a plug 203 (for plugging into utility power), and air power supply 112 has a separate plug 205. Also, the controller is not integrated because there is a cutting controller 109 which is separate and distinct from compressor controller 111. The controllers may share a board, but they do not share control circuitry, and/or control signals, and/or input signals.

Cutting power supply 104 provides cutting power on lines 107 and 108 to torch 106. Feedback may be provided from cutting power supply 104 and/or output lines 107 and 108, and/or torch 106 to controller 109. Air power supply 112 provides power to compressor 114. Compressor 114 provides air to torch 106. Feedback may be provided from the output of the air power supply 112, or from within the air power supply 112, to controller 111 to control or regulate air power supply 112.

Other alternatives provide for an integrated power supply and/or integrated controller, but without an integrated housing, and for controller 110 (FIG. 1) to be distributed over several boards.

Figure 3:
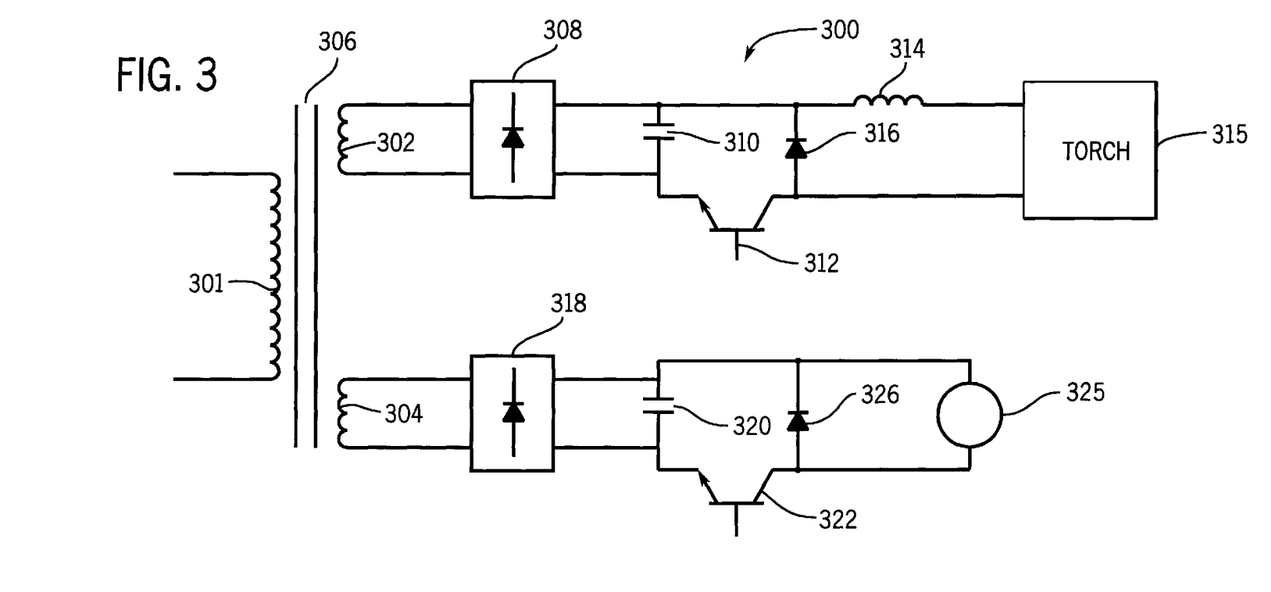
FIG. 3 is a circuit diagram of a cutting power circuit and compressor power circuit used in a plasma cutter constructed in accordance with the present invention.

A power circuit 300, consistent with the preferred embodiment, is shown generally in FIG. 3, and provides for an integrated power source, wherein the cutting power supply and the compressor power supply have separate secondaries, but share a common core 306 and a common primary 301. The power circuits are preferably conventional buck convertors, choppers or secondary switcher power supplies. The power supplies are inverters, other converters, phase controlled, or other types of power supplies in various alternative embodiments.

Utility or generator power is applied to primary 301, and a voltage is induced on a cutting secondary 302. The output of cutting secondary 302 is rectified by a diode bridge 308 (preferably a full wave bridge). The windings are selected so that a 225 vac signal is induced across winding 302, and a 320 volt, rectified DC signal is applied across an electrolytic capacitor 310. The 320 volt DC bus created across electrolytic capacitor 310 is provided through an inductor 314 to torch 315. A power switch 312, such as an IGBT, is used to regulate the power provided to torch 315 by "chopping" the DC bus. When switch 312 is on, current is provided from the DC bus through inductor 314 to torch 315, and back through switch 312 to the DC bus. When switch 312 is off, current freewheels through a diode 316, inductor 314, and torch 315. By controlling the amount of time switch 312 is on, the average power provided to torch 315 is determined.

In accordance with the preferred embodiment the on-time of switch 312 is determined to provide a predetermined cutting current, using a factory set point. In alternative embodiments the setpoint may be a user selectable setpoint, such as a setpoint derived from a potentiometer on a control panel. The cutting power circuit, and control thereof, is preferably consistent with a prior art plasma cutter, such as a Miller Spectrum 300™ plasma cutter, but with a single buck converter, secondary switcher or chopper. The controller preferably receives a plasma current feedback signal (i.e., a signal indicative of output cutting or pilot current, such as magnitude, dI/dt, or some other function of current).

The compressor motor power source is also a buck converter or chopper, and a 24 vac signal is induced on a compressor secondary 304. The output of compressor secondary 304 is rectified by a diode bridge 318 (preferably a full wave bridge). A 32 volt, rectified DC signal is applied across an electrolytic capacitor 320. The 32 volt DC bus created across electrolytic capacitor 320 is provided to motor 325, which acts as an inductive load (and thus functionally corresponds to inductor 314). A power switch 322, such as a MOSFET, is used to regulate the power provided to motor 325 by "chopping" the DC bus. When switch 322 is on, current is provided from the DC bus through motor 325 and back through switch 322 to the DC bus. When switch 322 is off, current freewheels through a diode 326 and motor 325. By controlling the amount of time switch 322 is on, the average power, voltage and/or current provided to motor 325 is determined.

In accordance with the preferred embodiment the on-time of switch 322 is determined to provide a predetermined motor voltage, using a factory set point in a current control mode (using current and voltage feedback). In alternative embodiments the setpoint may be a user selectable setpoint, such as a setpoint derived from a potentiometer on a control panel. The controller preferably receives a trigger signal and/or a plasma current feedback signal (i.e., a signal indicative of output cutting current, such as magnitude, dI/dt, or some other function of current). The controller preferably receives a motor voltage and/or current feedback signal, such as the magnitude of the voltage across or current through the motor windings, dV/dt, dI/dt, or some other function of voltage or current.

Figure 4:
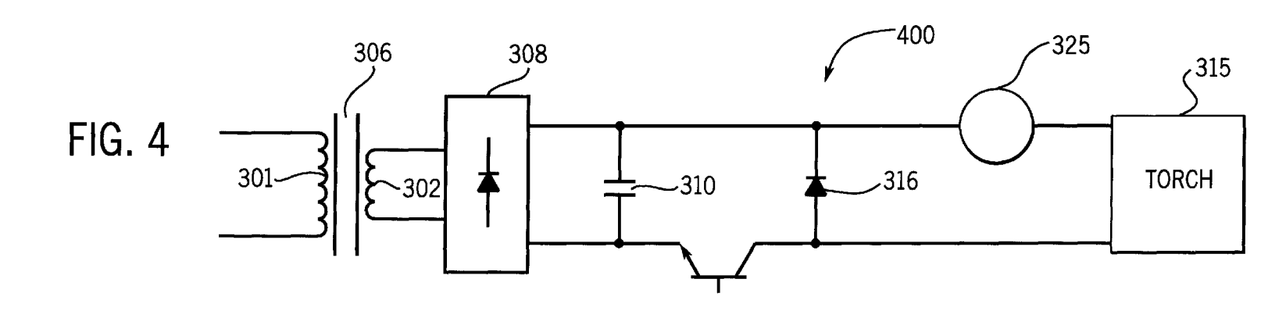
FIG. 4 is a circuit diagram of a combined cutting power and compressor power circuit used in a plasma cutter constructed in accordance with the present invention.

The motor windings replace or supplement inductor 314 as the inductive element for the plasma cutting buck converter in an alternative embodiment, shown in FIG. 4. Utility or generator power is applied to primary 301, and cutting secondary 302 and diode bridge 308 create 320 vdc across electrolytic capacitor 310. The circuit functions as above, but the windings of motor 325 helps the current freewheel through diode 316. Thus, the power and control are integrated in this embodiment.

Figure 5:
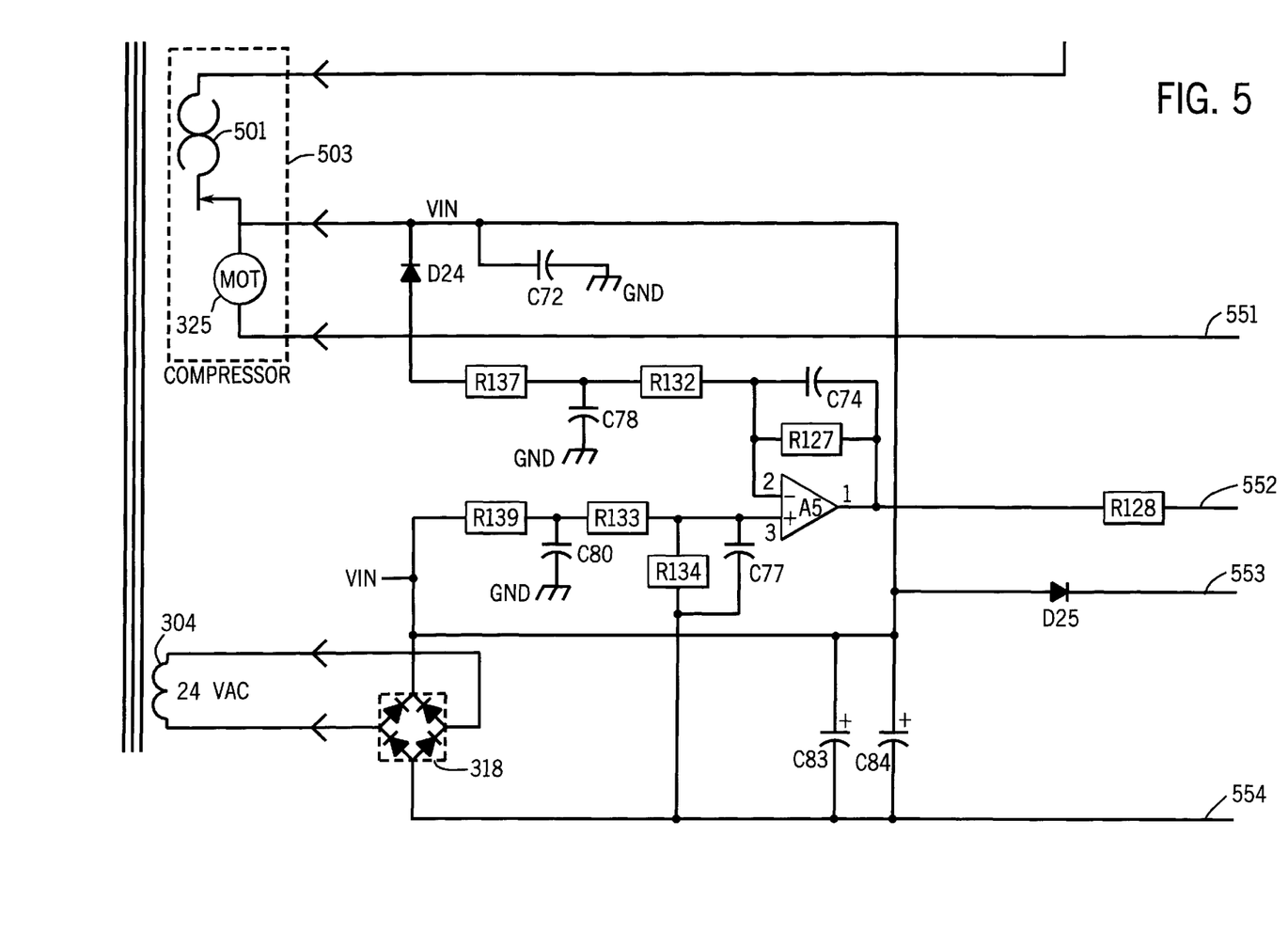
FIG. 5 is a circuit diagram of a portion of a controller or compressor regulator and a compressor power circuit used in a plasma cutter constructed in accordance with the present invention.
Figure 6:
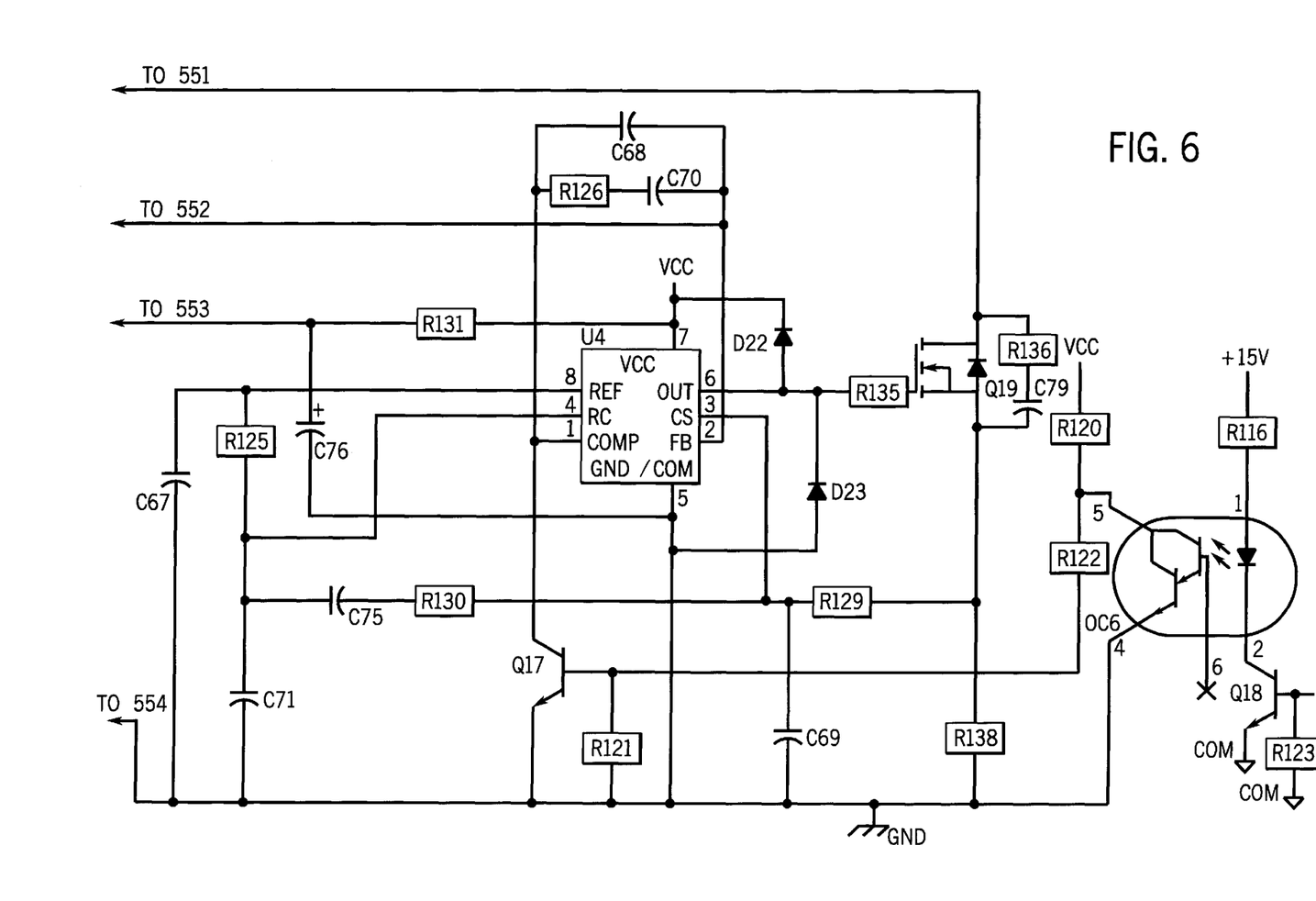
FIG. 6 is a circuit diagram of a portion of the controller or compressor regulator and a compressor power circuit used in a plasma cutter constructed in accordance with the present invention.

A compressor motor power and control circuit is shown in FIGS. 5 and 6. Generally, the control circuit senses the motor winding voltage and current and regulates the voltage by PWM to provide a desired average voltage. Rather than use winding voltage as feedback, current, power, air pressure, air flow and/or functions thereof are used in alternative embodiments. Also, rather than using a voltage setpoint, other motor parameters, such as current, power, and/or functions thereof are used in some embodiments.

Referring now to FIG. 5, a compressor 503 includes motor 325 and a thermostat 501. Compressor 503 is preferably a commercially available compressor, such as one from Thomas Industries of Sheboygan, Wis., but other compressors may be used. Thermostat 501 is used for protective functions. Preferably, motor 325 has a relatively constant voltage applied thereto, to increase efficiency, and reduce the need for oversizing.

Compressor winding 304 is connected to diode bridge 318, which is connected to electrolytic capacitors C83 (2200 µF) and C84 (2200 µF) which form a dc bus. The dc bus is connected to motor 325. Motor 325 has a freewheeling diode D24 (326 in FIG. 3) connected across it. A filtering capacitor C72 (0.1 µF) is provided. A MOSFET Q19, shown in FIG. 6 (322 of FIG. 3), is opened and closed, thus intermittently connecting power across the motor. When switch Q19 is closed, the inductance of the windings in motor 325 causes current to freewheel through diode D24.

Control of the circuit may be understood with reference to FIG. 6. An on/off circuit includes a switch Q18. Switch Q18 is normally off, and is turned on when a cutting or pilot current is sensed (via a signal applied to the base of switch Q18). As will be explained below, when switch Q18 turns on, the compressor is turned on, and when switch Q18 turns off, the compressor is turned off. A torch trigger signal is sensed (rather than the cutting or pilot current) in an alternative embodiment. Because the trigger signal and/or sensed current signal regulates the compressor and is used to control the cutting power supply, the controllers are integrated (i.e., share common control signals).

A resistor R123 (4.75K ohms), an opto-isolator OC6, and a resistor R116 (2.21K ohms) cooperate with switch Q18 to provide the on/off signals. Switch Q18 (and thus the compressor) remain on for delay time after the cutting or pilot current ends to provide a post-flow in the preferred embodiment. The delay can be designed or inherent in the control and power circuitry. An on/off circuit, as used herein, is a circuit that turns the compressor on and off in response to an input, such as a trigger signal, sensed current, or other signal.

The output of opto-isolator OC6 (high when switch Q18 is off and low when switch Q18 is on) is divided by a voltage divider including resistors R120 (4.75K ohms), R121 (4.75K ohms), and R122 (4.75K ohms). The voltage divider turns on and off a switch Q17. Switch Q17 is connected to pin 1 of a PWM chip U4 (Unitrode™, preferably). When pin 1 is low (switch Q17 is on) the PWM chip does not modulate, and the compressor motor does not receive power. When switch Q18 turns on, turning off switch Q17, then pin 1 of U4 is released, and U4 will pulse width modulate, providing power to motor 325.

The modulation output of PWM chip U4 is provided through a resistor R135 (10 ohms) to MOSFET Q19 (which has a snubber including a capacitor C79 (0.0047 µF) and a resistor R136 (100 ohms), and diodes D22 and D23 to protect its gate drive). As described above, when switch Q19 is on, voltage is provided to motor 325. When switch Q19 is off, motor 325 freewheels. Thus, by modulating the on time of switch Q19, PWM chip U4 controls the average voltage delivered to motor 325.

The current through motor 325 and switch Q19 also passes through a resistor R138 (0.05 ohms). The voltage across resistor R138 is provided through a resistor R129 (1K ohms) to pin 3 of PWM chip U4, which limits the peak current through switch Q19 and motor 325. PWM chip U4 includes an internal setpoint of 1 volt, and resistor R138 is chosen such that the desired current through resistor R138 produces a voltage of 1 volt at pin 3 of PWM chip U4. Resistor R129 and a capacitor C69 (0.001 µF) filter noise.

A resistor R130 (182K ohms) and a capacitor C75 (1 µF) are used for slope compensation of the feedback signal, consistent with known current control mode PWM regulation. When the switch is turned on later in a cycle, the current is further limited by the signal from capacitor C75 and resistor R130.

A resistor R125 (100K ohms) and a capacitor C71 (330 pF) set the RC time constant for the PWM frequency (approx. 35 KHz in the preferred embodiment). A capacitor C67 (0.1 pF) acts as a filter.

Motor winding voltage feedback is provided by an op amp A5 (FIG. 5) though a buffer resistor R128 (10K ohms). Motor voltage and the 32 volt dc bus are provided to op amp A5 through a plurality of scaling/feedback resistors R137 (51.1K ohms), R132 (51.1K ohms), R127 (20K ohms), R139 (51.1K ohms), R133 (51.1K ohms) and R134 (20K ohms). Filtering capacitors C74 (0.01 µF), C78 (0.001 µF), C77 (0.01 µF and C80 (0.001 µF) are also provided. Generally, the motor winding voltage is scaled by op amp A5 and provided to pin 2 of PWM chip U4. PWM chip U4 has an internal setpoint, and the feedback is scaled so that the desired winding voltage corresponds to the set point. Thus, the voltage applied to the motor winding is PWM controlled to obtain a desired voltage, but in CC mode as set forth above. In an alternative embodiment, the setpoint is not fixed, but is user selectable, such as by having a potentiometer on the front panel adjust a scaling resistance or change the setpoint directly.

A diode D25, a capacitor C76 (68 µF) and a resistor R131 (2K ohms) maintain and limit power to PWM chip U4 if there is a momentary interruption of Vcc power. Capacitor C68 (0.001 µF), capacitor C70 (0.1 µF) and resistor R126 (10K ohms) acts as a filter.

As may be seen, compressor motor 325 is controlled in response to voltage winding feedback, and in response to sensed cutting or pilot current or a trigger signal. In alternatives embodiments it is controlled (turned on and off) only in response to a trigger signal or sensed cutting or pilot current.

Numerous modifications may be made to the present invention which still fall within the intended scope hereof. Thus, it should be apparent that there has been provided in accordance with the present invention a method and apparatus for plasma cutting with a regulated, integrated compressor that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A plasma cutter comprising:
    a cutting power supply disposed to provide power to a plasma torch;
    an air compressor, disposed to provide air to the plasma torch, wherein the air compressor is integrated into the plasma cutter, and wherein the air compressor includes a compressor motor; and
    a compressor regulator disposed to receive a feedback signal, and further disposed to regulate the compressor motor in response to the feedback signal.

2. The apparatus of claim 1, wherein the compressor regulator is further disposed to receive a trigger signal, and the compressor regulator further includes an on/off circuit responsive to the trigger signal.

3. A plasma cutter comprising:
a cutting power supply disposed to provide power to a plasma torch;
an air compressor, disposed to provide air to the plasma torch, wherein the air compressor is integrated into the plasma cutter, and wherein the air compressor includes a compressor motor; and
a compressor regulator disposed to receive a feedback signal, and further disposed to regulate the compressor motor in response to the feedback signal and further disposed to receive a plasma current feedback signal, and includes an on/off circuit responsive to the plasma current feedback signal.

4. The apparatus of claim 3, wherein the compressor regulator further includes a fixed setpoint, and further includes a regulator circuit having as inputs the fixed setpoint and the feedback signal.

5. The apparatus of claim 4, wherein the feedback signal is a compressor motor voltage feedback signal.

6. The apparatus of claim 3, further comprising a cutting power controller disposed to receive a trigger signal, a set point and a cutting power feedback signal, and disposed to provide a cutting power control signal in response to the trigger signal, the set point and the cutting power feedback signal.

7. The apparatus of claim 6, wherein the cutting power controller and the compressor regulator are part of an integrated controller, whereby the air compressor is integrated into the plasma cutter by having an integrated controller.

8. The apparatus of claim 1, wherein the plasma cutter includes a housing, and the cutting power supply and the air compressor are disposed in the housing, whereby the air compressor is integrated into the plasma cutter by having an integrated housing.

9. The apparatus of claim 1, wherein the cutting power supply is disposed to provide power to the air compressor, whereby the air compressor is integrated into the plasma cutter by having an integrated power supply.

10. The apparatus of claim 1, wherein the cutting power supply includes a transformer having a cutting winding and a compressor winding.

11. The apparatus of claim 10, wherein the air compressor includes an air compressor power supply having a buck convertor, connected to the compressor winding, and having a switch and an inductive element, and wherein the air compressor motor is at least part of the inductive element.

12. The apparatus of claim 1, wherein the cutting power supply includes a buck convertor, connected to a cutting winding, and having a switch and an inductive element, and wherein the air compressor motor is at least part of the inductive element.

13. A plasma cutter comprising:
cutting means for providing power to a plasma torch;
air compressor means for providing air to the plasma torch, wherein the air compressor means is integrated into the plasma cutter, and wherein the air compressor means includes a compressor motor; and
a compressor regulator means for receiving a feedback signal and for regulating the compressor motor in response to the feedback signal.

14. The apparatus of claim 13, wherein the compressor regulator means further includes means for turning the air compressor means on and off in response to a plasma current feedback signal.

15. A plasma cutter comprising:
cutting means for providing power to a plasma torch;
air compressor means for providing air to the plasma torch, wherein the air compressor means is integrated into the plasma cutter, and wherein the air compressor means includes a compressor motor; and
a compressor regulator means for receiving a feedback signal and for regulating the compressor motor in response to the feedback signal, wherein the compressor regulator means further includes a fixed setpoint, and includes a regulator circuit means for comparing the fixed setpoint and a compressor motor voltage feedback signal.

16. The apparatus of claim 13, further comprising a cutting power controller means for controlling the cutting power in response to a fixed set point and a cutting power feedback signal, and wherein the cutting power controller means and the compressor regulator means are part of an integrated controller, whereby the air compressor is integrated into the plasma cutter by having an integrated controller.

17. The apparatus of claim 13, wherein the plasma cutter includes a housing, and the cutting power supply means and the air compressor means are disposed in the housing, whereby the air compressor means is integrated into the plasma cutter by having an integrated housing.

18. The apparatus of claim 13, wherein the cutting power supply means is further for providing power to the air compressor means, whereby the air compressor means is integrated into the plasma cutter by having an integrated power supply.

19. The apparatus of claim 13, wherein the air compressor means includes a buck convertor, connected to a compressor winding, and having a switch and an inductive element, and the air compressor motor is at least part of the inductive element.

20. The apparatus of claim 1, wherein the cutting power supply means includes a buck convertor, connected to a cutting winding, and having a switch and an inductive element, and the air compressor motor is at least part of the inductive element.

21. A method of plasma cutting comprising:
providing plasma cutting power to a plasma torch with a cutting power supply;
compressing air with an air compressor, wherein the air compressor is integrated into the plasma cutter, and wherein the air compressor includes a compressor motor;
providing the compressed air to the plasma torch; and
regulating the air compressor motor in response to a feedback signal.

22. The method of claim 21, further including turning on and off the compressor motor in response to a trigger signal.

23. The method of claim 21, further including turning on and off the compressor motor in response to a plasma current feedback signal.

24. The method of claim 3, wherein regulating includes comparing a motor voltage feedback signal to a fixed setpoint.

* * * * *